United States Patent [19]

Heitz et al.

[11] Patent Number: 4,598,143

[45] Date of Patent: Jul. 1, 1986

[54] PROCESS FOR THE PREPARATION OF AROMATIC POLYAMIDE IN THE PRESENCE OF SICL₄

[75] Inventors: Walter Heitz, Kirchhain; Peter Strohriegl, Coelbe/Buergeln, both of Fed. Rep. of Germany

[73] Assignee: Bayer Aktiengesellschaft, Leverkusen, Fed. Rep. of Germany

[21] Appl. No.: 683,002

[22] Filed: Dec. 18, 1984

[30] Foreign Application Priority Data

Dec. 30, 1983 [DE] Fed. Rep. of Germany ....... 3347580
Jan. 5, 1984 [DE] Fed. Rep. of Germany ....... 3400237

[51] Int. Cl.⁴ ........................................... C08G 69/28
[52] U.S. Cl. .................... 528/336; 528/179; 528/183; 528/320; 528/337; 528/348; 524/606
[58] Field of Search .............. 528/336, 348, 320, 179, 528/337, 183

[56] References Cited

U.S. PATENT DOCUMENTS

| | | | |
|---|---|---|---|
| 3,180,855 | 4/1965 | Black | 528/320 |
| 3,856,742 | 12/1974 | Hoppe et al. | 528/336 |
| 4,431,796 | 2/1984 | Choe et al. | 528/336 |

*Primary Examiner*—Harold D. Anderson
*Attorney, Agent, or Firm*—Connolly and Hutz

[57] ABSTRACT

The present invention relates to a process for the preparation of aromatic polyamides mixed with $SiO_2$, which is characterized in that terephthalic (isophthalic) acid is subjected to polycondensation with aromatic diamines in the presence of $SiCl_4$ and tertiary aromatic nitrogen heterocyclic compounds, to the polyamides which are produced as a mixture with $SiO_2$ and to a process for their isolation.

6 Claims, No Drawings

PROCESS FOR THE PREPARATION OF AROMATIC POLYAMIDE IN THE PRESENCE OF SICL₄

The invention relates to a process for the preparation of aromatic polyamides containing recurring structural units of the formula I

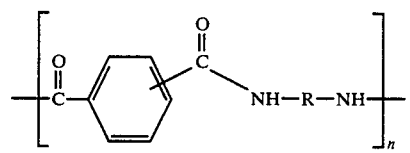

wherein
R is

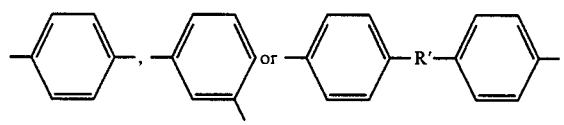

in which
R' is a single bond, —CH₂—, —O—,

or —S—, and
wherein
n is 2 to 200, preferably 5 to 100, as a mixture with SiO₂, which process is characterised in that terephthalic acid and/or isophthalic acid is subjected to polycondensation with approximately equimolar amounts of diamines of the formula II

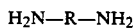  (II)

wherein
R has the meaning mentioned for the formula I, in the presence of SiCl₄ and tertiary aromatic nitrogen heterocyclic compounds as solvent, at temperatures of 60° C. to 200° C., preferably 100° C. to 150° C., and pressures of 1 to 10 atmospheres, preferably 1 atmosphere, 1 to 2 moles of SiCl₄ being employed per mole of dicarboxylic acid. Compared with known processes (see, for example, H. G. Elias in Ullmanns Encyclopädie der technischen Chemie ["Ullmann's Encyclopedia of Industrial Chemistry"], 4th Edition, Volume 11, page 343) the process offers the advantage of particular simplicity since the use of carboxylic acid chlorides is not necessary.

Mixtures of polyamides and SiO₂ which can be processed without further treatment to give articles of use, are formed in the reaction. The SiO₂ can be removed by dissolving the polyamides in H₂SO₄ or N-methylpyrrolidone/LiCl and filtration. The polyamides can be isolated in a known manner in a pure form from these solutions.

Examples of suitable tertiary aromatic nitrogen heterocyclic compounds are compounds having at least one N atom in the ring having 5 to 6 ring members and being optionally condensed with a further aromatic ring, preferably pyridine, picolines, lutidines, quinoline or isoquinoline. The concentration of the dicarboxylic acid and of the diamine in the nitrogen heterocyclic compound is between about 0.1 and about 1 mole per liter of nitrogen heterocyclic compound. Mixtures of the above mentioned aromatic nitrogen bases with other solvents which are inert under the reaction conditions, such as for example, chlorobenzene or decane, can also be used as the solvent. The temperature chosen can depend on the solvent used; at temperatures above the boiling point of the particular solvent employed, it is necessary to use excess pressure concomitantly. Preferred variants are pyridine or pyridine/chlorobenzene mixtures, in which case it is possible to carry out the reaction without excess pressure at the boiling point of the particular solutions.

The reaction according to the invention can be represented by the following equation:

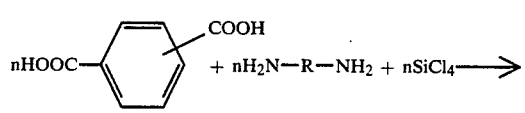

III          II

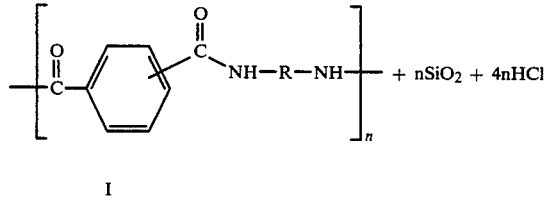

I

Regulation of the molecular weights is effected essentially via the molar ratio of dicarboxylic acid to SiCl₄ employed in a particular case.

The molecular weights achieved are determined via the intrinsic viscosities, which were determined at 30° C. on solutions of 0.5 g of polyamide in 100 ml of concentrated sulphuric acid.

The separation of the resulting polyamides and SiO₂ from the solvent or solvent mixture can be effected in a known manner, for example by acidification and filtration. The removal of SiO₂, which may be desirable in a given case, has already been described previously.

The polyamides with or without a content of SiO₂ which are obtained in accordance with the invention can be used industrially in a known manner, for example they are suitable for the preparation of pulps.

EXAMPLE 1

Preparation of poly-(1,4-phenyleneterephthalamide)

4.15 g of terephthalic acid, 2.70 g of 1,4-phenylenediamine and 90 ml of pyridine are run into a three-necked flask equipped with external heating, a KPG stirrer, a reflux condenser and a dropping funnel. 4.58 ml of silicon tetrachloride are added dropwise while the mixture is cooled with ice, and the mixture is then heated at reflux temperature for 48 hours. The reaction mixture is worked up by being stirred into 800 ml of 2N HCl. The product is filtered off with suction and is thoroughly washed with water, methanol and acetone. 8.22 g (98%) of a mixture of poly-(1,4- phenyleneterephthalamide) and silicon dioxide are obtained after drying. The silicon dioxide is removed by dissolving the product in 400 ml of concentrated sulphuric acid and filtering the mixture through a glass frit. The polymer is precipitated in water, filtered off with suction, washed thoroughly with hot water, methanol and acetone and dried.

Yield: 5.48 g=92%

Inherent viscosity: 0.60 (determined as explained above).

EXAMPLE 2

Preparation of poly-(1,3-phenyleneisophthalamide)

3.32 g of isophthalic acid, 2.16 g of 1,3-phenylenediamine, 40 ml of chlorobenzene and 20 ml of pyridine are run into a 100 ml three-necked flask equipped with external heating, a KPG stirrer, a reflux condenser and a dropping funnel. 2.86 ml of silicon tetrachloride are added dropwise while the mixture is cooled with ice, and the mixture is then heated at reflux temperature for 48 hours. The reaction mixture is worked up by being stirred into a mixture of 300 ml of 2N HCl and 300 ml of methanol. The polymer is filtered off with suction and is washed thoroughly with water, methanol and acetone.

The silicon dioxide is removed by dissolving the product in 250 ml of concentrated sulphuric acid and filtering the mixture through a glass frit. The polymer is precipitated in water, filtered off with suction, washed thoroughly with hot water, methanol and acetone and dried.

Yield: 4.68 g=98%

Inherent viscosity: 0.51.

We claim:

1. A process for the production of an aromatic polyamide containing recurring units of the formula

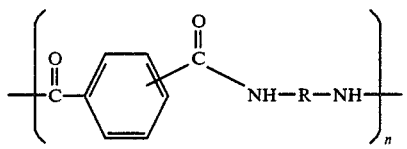

wherein n is 2 to 200,

R denotes

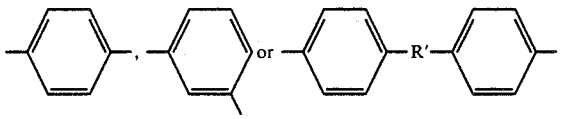

in which

R' denotes a single bond or R' represents —CH$_2$—, —O—,

or —S—, mixed with SiO$_2$, in which terephthalic acid, isophthalic acid or both are subjected to polycondensation reaction with an approximately equimolar amount of amine of the formula $$H_2N-R-NH_2$$

wherein

R is defined above, in the presence of SiCl$_4$ and a solvent comprising a tertiary aromatic nitrogen heterocyclic compound, at a temperature of 60° C. to 200° C. and a pressure of 1 to 10 atmospheres, 1 to 2 moles of SiCl$_4$ being employed per mole of dicarboxylic acid.

2. A process according to claim 1, in which the reaction is carried out at a temperature of 100° to 150° C.

3. A process according to claims 1 or 2 in which the solvent is a mixture of the aromatic nitrogen heterocyclic compound with other solvent inert under the reaction conditions.

4. A process according to claim 3, in which the solvent is pyridine or a pyridine/chlorobenzene mixture.

5. A process according to claims 1 or 2 in which the reaction is carried out at a pressure of 1 atmosphere.

6. A process according to claim 5, in which the reaction is carried out at the boiling point of the solvent.

* * * * *